United States Patent [19]

Hrachovy

[11] Patent Number: 5,322,121
[45] Date of Patent: Jun. 21, 1994

[54] HYDRAULIC FRACTURING TECHNIQUE EMPLOYING IN SITU PRECIPITATION

[75] Inventor: Marty J. Hrachovy, Newport Beach, Calif.

[73] Assignee: Union Oil Company of California, Los Angeles, Calif.

[21] Appl. No.: 949,712

[22] Filed: Sep. 23, 1992

[51] Int. Cl.$^5$ .................... E21B 43/12; E21B 43/26
[52] U.S. Cl. .................... 166/279; 166/308; 252/8.551
[58] Field of Search .................... 166/279, 280, 308; 252/8.551

[56] References Cited

U.S. PATENT DOCUMENTS

| | | | |
|---|---|---|---|
| 3,233,673 | 2/1966 | Spain et al. | 166/280 |
| 3,704,750 | 12/1972 | Miles et al. | 166/279 |
| 3,782,469 | 1/1974 | Fulford | 166/279 |
| 4,393,938 | 7/1983 | Lawson et al. | 166/305.1 X |
| 4,947,934 | 8/1990 | Hen | 166/310 X |

OTHER PUBLICATIONS

Vetter, O. J., "How Barium Sulfate is Formed: an Interpretation", SPE *JPT*, EC. 1975, P.1517.
Gates, G. L., Carawat, W. H., "Oil; Well Scale Formation in Waterflood Operations Using Ocean Brines, Wilmington, CA", U.S. Department of Interior Bureau of Mines RI 6658, 1965.
Yaun, M. D., and Todd, A. C., "Prediction of Sulfate Scaling Tendency in Oilfield Operations", SPE 18484, *JPT*, Feb. 1991.
Todd, A. C. "Authors' Reply to Discussion of Prediction of Sulfate Scaling Tendency in Oilfield Operations", SPE 23470, Aug. 1991.
Uchameyshvili, N. Ye, et al., "Solubility of Barite in Concentrated Chloride Solutions of Some Metals at Elevated Temperatures in Relation to problems of the Genesis of Barite Deposits", trans from *Geokhimiya*, No. 10, pp. 1193-1205, 1966.
Rosmalen, G. M., "Scale Prevention with Special Reference to Threshold Treatment", reprinted in *Chemical Eng. Commun.*, vol. 20, pp. 209-233, AIChE, Nov. 1981.
Whitten, K. W., and Gailey, K. D., *General Chemistry*, 1981, p. 267.
Doremus, R. H., "Crystallization of Slightly Soluble Salts from Solution", *The Journal of Physical Chemistry*, vol. 74, No. 7, Apr. 2, 1970, p. 1405.
Todd et al., SPE Production Engineering, Aug. 1990, pp. 279-285.
Gates et al., RI Bureau of Mines Report Investigation 6960, U.S. Department of the Interior, Bureau of Mines, Jun. 1967, pp. 1-16.
Hamouda et al., Rogalandsforskning Progress Report No. 2/1983, pp. 1-16.
Rybacki, R. L. "Understanding Scale Inhibitors", *Well Servicing*, Jul./Aug. 1981, pp. 43-46.
Pritchard et al., "Inhibition of Sulphate Scale Nucleation", 22nd Annual OTC in Houston, Texas, May, 1990, pp. 67-75.
Weintritt et al., "Unique Characteristics of Barium Sulfate Scale Deposition", *Journal of Petroleum Technology*, Oct. 1967, pp. 1381-1394.
Allaga et al., SPE Formation Evaluation, *Society of Petroleum Engineers*, Mar. 1992, pp. 79-86.

*Primary Examiner*—George A. Suchfield
*Attorney, Agent, or Firm*—Gregory F. Wirzbicki; Shlomo R. Frieman

[57] ABSTRACT

A fracturing fluid comprises (a) a carrier, (b) a nucleating agent capable of reducing the concentration of scale-forming ingredients and/or natural occurring radioactive materials (NORMs) present in an aqueous subterranean fluid, and optionally (c) an ingredient selected from the group consisting of proppants, friction-reducing additives, fluid-loss-control additives, gelling agents, bactericides, and scale stabilizers. The fracturing fluid is employed in hydraulic fracturing procedures to, among other things, reduce the concentration of the scale-forming ingredients and/or NORMs present in produced aqueous subterranean fluids.

44 Claims, 2 Drawing Sheets

HYDRAULIC FRACTURING TECHNIQUE EMPLOYING IN SITU PRECIPITATION

BACKGROUND

The present invention relates to (a) hydraulic fracturing techniques, (b) hydraulic fracturing fluids, and (c) hydraulically fractured subterranean formations.

A common problematic occurrence is the formation of scale proximate and/or within the casing of a production well as well as within equipment handling aqueous fluids produced from a subterranean formation. The scale can reduce, and even totally block, the production of oil or gas or geothermal fluid from the production well. In addition, in subterranean formations containing a high level of a naturally occurring radioactive material (NORM), such as $^{226}$Ra and $^{228}$Ra, the scale formed in the casing and equipment can reach levels which require the scale-containing casing and equipment to be handled and disposed of as a radioactive waste.

Some aqueous subterranean fluids contain both scale-forming constituents and NORMs, while other aqueous fluids essentially contain only one of these adverse constituents.

SUMMARY OF THE INVENTION

The present invention provides a method for retarding the formation of scale and NORMs proximate and/or within the casing of a production well as well as within equipment handling aqueous fluid produced from a subterranean formation. More particularly, the method of the invention entails injecting through a production well and into at least a portion of a subterranean formation under hydraulic fracturing conditions a fracturing fluid comprising a carrier fluid and a nucleating agent capable of reducing the concentration of scale-forming ingredients and NORMs present in the aqueous subterranean fluid. The nucleating agent is present in the fracturing fluid in a sufficient concentration to reduce the concentration of one or more scale-forming ingredients and/or one or more NORMs present in the aqueous subterranean fluid produced from the production well. Optionally, an additional constituent selected from the group consisting of proppants, friction-reducing additives, fluid-loss-control additives, gelling agents, bactericides, and scale stabilizers is present in the fracturing fluid.

In addition, the invention provides a fracturing fluid and a natural resource system. The fracturing fluid comprises the carrier fluid, the nucleating agent, and optionally an additional constituent selected from the group consisting of proppants, friction-reducing additives, fluid-loss-control additives, gelling agents, bactericides, and scale stabilizers.

The natural resource system comprises a subterranean formation, a natural resource (e.g., oil, natural gas, and/or a geothermal fluid) present in at least a portion of the subterranean formation, and a well penetrating at least a portion of the subterranean formation. In one embodiment, the natural resource system further comprises a fracture formed from the method of the present invention. In another embodiment, the natural resource system also comprises a pipe present in at least a portion of the well and one of the fracturing fluids of the present invention present in at least a portion of the pipe.

Without being bound by the following theoretical explanation, it is believed that the nucleating agent provides a nucleation site for scale-forming and NORM components in the aqueous subterranean formation fluids. These nucleation sites are very attractive to chemically similar ions in the aqueous fluids. For wells with scaling tendencies, the nucleating agents encourage the removal of scale-forming constituents present in the aqueous subterranean fluids as well as the deposition of such scale-forming constituents deep in the fracture rather than in the near wellbore region. The deposition of scale deep in the fracture is less damaging to production than scale deposited near the wellbore.

Similarly, for wells producing a NORM-containing aqueous subterranean fluid, the nucleating agents encourage the removal of the NORMs present in the aqueous subterranean fluids as well as the deposition of such NORMs in the reservoir or subterranean formation (where they are not an environmental or safety problem), rather than in well casing, tubing, or surface facilities handling the produced aqueous subterranean fluids (where they tend to be an environmental and/or safety problem).

Hence, for aqueous subterranean fluids containing a scale-forming constituent, the presence of the nucleating agent in the fracturing fluid lowers the concentration of the scale-forming ingredient in the produced aqueous subterranean fluids. Likewise, for NORM-containing aqueous subterranean fluids, the presence of the nucleating agent in the fracturing fluid reduces the NORM concentration in the produced aqueous subterranean fluids. In addition, for aqueous subterranean fluids containing both a NORM and a scale-forming constituent, the presence of the nucleating agent in the fracturing fluid decreases the NORM and scale-forming ingredient concentrations in the produced aqueous subterranean fluids.

DRAWINGS

The reduction in the concentration of scale-forming constituents and NORMs present in aqueous fluids produced from a subterranean formation by a nucleating agent, as well as other features, aspects, and advantages of the invention will become better understood with reference to the following description, appended claims, and accompanying drawings wherein:

DETAILED DESCRIPTION OF THE INVENTION

The fracturing fluid employed in the present invention comprises a carrier fluid and a nucleating agent for reducing the concentration of scale-forming constituents and/or naturally occurring radioactive materials (NORMs) in aqueous fluids produced from a subterranean formation. Any carrier fluid capable of being employed in a hydraulic fracturing procedure can be employed in the present invention. Exemplary carrier fluids are discussed in Howard et al., *Hydraulic Fracturing*, Society of Petroleum Engineers of the American Institute of Mining, Metallurgical, and Petroleum Engineers, Inc., New York, N.Y. (1970) (hereinafter referred to as "Howard"), chapter 5, as well as in Allen et al., *Production Operations*, Oil & Gas Consultants, Inc, Tulsa, Okla. (1989) (hereinafter referred to as "Allen"), volume 2, chapter 8, Howard and Allen being incorporated herein in their entireties by reference. Typical carrier fluids include, but are not limited to those listed in the following Table I.

TABLE I

| Carrier Fluids | |
| --- | --- |
| Class | Species |
| Oil-Base Fluids | Napalm gels (e.g., gasoline, kerosene, diesel oil, or crude oil gelled with Napalm) |
| | Viscous refined oils |
| | Lease crude oils |
| | Gelled lease oils |
| Water-Base Fluids | Linear aqueous gels |
| | Crosslinked aqueous gels |
| | Alcohol-containing fluids |
| | Foamed fluids |
| | Thickened aqueous fluids |
| Acid-Base Fluids | Gelled acids |
| | Acid emulsions |
| | Chemically retarded acids |

Exemplary nucleating agents used in the present invention include, but are not limited to, alkaline earth metal sulfates and alkaline earth metal carbonates. The preferred alkaline earth metals are magnesium, calcium, strontium, and barium, with barium being the most preferred. Typical alkaline earth metal sulfates and alkaline earth metal carbonates include, barium sulfate, barium carbonate, calcium sulfate, calcium carbonate, magnesium carbonate, and magnesium sulfate.

The fracturing fluid optionally comprises any proppant, friction-reducing additive, fluid-loss-control additive, gelling agent, bactericide, and/or any other ingredient (e.g., scale stabilizer) employed in a hydraulic fracturing fluid. Proppants that can be employed in the fracturing fluid of the present invention are discussed in chapter 6 of Howard and chapter 8 of Allen, these references having already been incorporated herein in their entireties by reference. More particularly, exemplary proppants include, but are not limited to, sand, aluminum, glass beads, nutshells, plastics, sintered bauxite, urea, and sodium bisulfate.

Friction-reducing additives, fluid-loss-control additives, gelling agents, bactericides, and scale stabilizers are discussed in chapter 5 of Howard and include the materials listed below in Table II.

TABLE II

| Optional Fracturing Fluid Additives | |
| --- | --- |
| Additive | Examples |
| Friction-Reducing | Fatty acid soap-oil gel |
| | High-molecular weight polymers (e.g., polyacrylamides, partially hydrolyzed polyacrylamides) |
| | Guar gum |
| | Cellulose derivatives |
| Fluid-Loss-Control | Gas |
| | Guar gum |
| | Hydroxyethyl cellulose |

TABLE II-continued

| Optional Fracturing Fluid Additives | |
| --- | --- |
| Additive | Examples |
| | Polyacrylamides |
| | Silica flour |
| Gelling Agent | Guar gum |
| | Hydroxyethyl cellulose |
| | Polyacrylamides |
| Bactericide | Quaternary amines |
| | Amide-type materials |
| | Halogenated phenols |
| Scale Stabilizer | Polyphosphates (e.g., sodium, magnesium, and calcium phosphates, and complexes thereof) |

The fracturing fluids of the present invention are prepared by processes analogous to those used to prepare fracturing fluids employed in the prior art, the main difference being the incorporation of the nucleating agent into the fracturing fluid. When a proppant is also present in the fracturing fluid, the nucleating agent can be mixed with the proppant prior to combining the proppant with the carrier fluid. Alternatively, the nucleating agent and the proppant are separately added to the carrier fluid during the preparation of the fracturing fluid.

In general, when a proppant is employed in the fracturing fluid, the fracturing fluid generally comprises at least about 0.01 volume percent nucleating agent based on the volume of the proppant employed in the fracturing fluid. Preferably, the fracturing fluid comprises about 0.01 to about 15, more preferably 0.1 to about 10, and most preferably about 1 to about 5, volume percent nucleating agent based on the proppant volume in the fracturing fluid.

When a proppant is not employed in the fracturing fluid, the fracturing fluid generally comprises at least about 0.01 volume percent nucleating agent based on the total volume of the fracturing fluid, i.e., the combined volume of the carrier fluid, the nucleating agent, and all other ingredients (e.g., friction-reducing additive, fluid-loss-control additive, gelling agent, bactericide, and scale stabilizer) present in fracturing. Preferably, in this embodiment of the invention, the fracturing fluid contains about 0.01 to about 20, more preferably about 0.1 to about 10, and most preferably about 1 to about 5 volume percent nucleating agent based on the total volume of the fracturing fluid.

The nucleating agent employed in the present invention usually is capable of passing through a No. 3 U.S. Standard Sieve. Typical size ranges for the nucleating agents include, but are not limited to, 6/12, 8/16, 12/20, 16/30, 20/40, 30/50, 40/70, and 70/140, wherein a minimum of about 90 percent of the tested nucleating agent sample falls between the designated U.S. Standard Sieve size numbers. Usually, not over about 0.1 percent of the total tested nucleating agent sample is larger than the numerator U.S. Standard Sieve size and not over about 1 percent of such sample is smaller than the denominator U.S. Standard Sieve size. In general, when a proppant is employed in the fracturing fluid, the nucleating agent preferably has a maximum particle size less than or equal to the maximum particle size of the proppant.

The fracturing fluids of the present invention are usually injected into a subterranean formation using procedures analogous to those disclosed in U.S. Pat. No. 4,488,975, U.S. Pat. No. 4,553,601, Howard, and chapter 8 of Allen, the patents being incorporated herein in their entireties by reference (Howard and Allen having already been incorporated herein in their entireties by reference). Typically, the nucleating agent is substantially uniformly distributed throughout the injected fracturing fluid. However, in certain situations, a nonuniform nucleating agent distribution is desirable. For example, when an aqueous subterranean fluid has a low scale forming ingredient concentration, it generally is desirable to include the scale nucleating agent in just the latter portion (e.g., about the last half or about the last quarter) of the injected fracturing fluid. Alternatively, in those instances where it is desired to maximize near wellbore conductivity, the nucleating agent concentration in the injected fracturing fluid is preferably gradually decreased during the hydraulic fracturing procedure.

EXAMPLES

The following examples, which are intended to illustrate and not limit the invention, demonstrate that the method of the present invention reduces the concentration of scale-forming constituents in water produced from a subterranean formation.

EXAMPLE 1

Dynamic Test at Reservoir Temperature and Pressure 15 ppm Ba++ in Feed

A stainless steel container (about 2"×about 14") capable of testing at conditions similar to typical oil reservoirs was filled with a mixture comprising about 97 volume percent 20/40 U.S. Standard Sieve Sizes sand and about 3 volume percent 20/40 U.S. Standard Sieve Sizes barium sulfate crystals.

The cation-containing brine and anion-containing brine shown below in Table A were both made using deionized water and were filtered through 45μm HA Millipore brand filters.

TABLE A

| Constituent | Concentration, mg/l |
|---|---|
| Cation-Containing Brine | |
| $CaCl_2.2H_2O$ | 24,738 |
| $MgCl_2.6H_2O$ | 791.3 |
| KCl | 781.8 |
| $SrCl.6H_2O$ | 632.9 |
| $H_3BO_3$ | 485.6 |
| $BaCl_2.2H_2O$ | varied |
| NaCl | 15,373 |
| Anion-Containing Brine | |
| $NaHCO_3$ | 672.1 |
| $Na_2SO_4$ | 878.4 |
| NaCl | 15,373 |

Equal volumetric rates (10 ml/minute each) of the cation- and anion-containing brines set forth above in Table A were pumped to a T-fitting where they were combined to form a scaling brine having a pH of about 7.07. The scaling brine was introduced into the filled, stainless steel container, the container being maintained at a temperature of about 65.6° C. (about 150° F.) and an internal pressure of about 3.549 pascal (Pa) (about 500 psig). The barium (Ba++) concentration in the combined sample employed in this Example 1 was about 15 ppm. An effluent sample was taken every half hour and checked for pH. An aliquot of each effluent sample (about 5 ml) was then placed in a bottle with about 20 ml of a nitric acid solution (about 2 volume percent nitric acid and also containing about 2,000 ppm KCl) to form a stabilized sample. Each stabilized sample was tested for Ba++ concentration using atomic absorption. Data obtained from the experiment are set forth in the following Table B and plotted in FIG. 1.

TABLE B

| | | | Scale Nucleating Agent-Containing Core 15 ppm Ba++ In Feed | | | | | |
|---|---|---|---|---|---|---|---|---|
| | | | Pressure, pascal (psig) | | Cation[1] Brine | Anion[2] Brine | Ba++, ppm | |
| Time, hrs | pH, Feed | pH, Eff[3] | Inlet | Outlet | Lt[4], ml | Lt, ml | Feed | Eff |
| 0.5 | N/D[5] | 7.5 | 4.238 (600) | 4.238 (600) | .3750 | 3500 | N/D | 5.5 |
| 1.0 | N/D | 7.5 | 4.273 (605) | 4.307 (610) | 3500 | 3250 | N/D | 7.75 |
| 1.5 | N/D | 7.5 | 4.293 (608) | 4.307 (610) | 3300 | 2900 | N/D | 6.0 |
| 2.0 | 7.5 | 7.5 | 4.293 (608) | 4.307 (610) | 2850 | 2650 | 15.5 | 6.0 |
| 2.5 | N/D | 7.5 | 4.293 (608) | 4.307 (610) | 2685 | 2350 | N/D | 6.0 |
| 3.0 | N/D | 7.5 | 4.293 (608) | 4.307 (610) | 2400 | 2150 | N/D | 6.5 |
| 3.5 | N/D | 7.5 | 4.293 (608) | 4.307 (610) | 2050 | 1800 | N/D | 6.0 |
| 4.0 | 7.5 | 7.5 | 4.293 (608) | 4.307 (610) | 1750 | 1500 | 15.5 | 5.0 |
| 4.5 | N/D | 7.0 | 4.293 (608) | 4.307 (610) | 1500 | 1250 | N/D | 5.0 |
| 5.0 | N/D | 7.0 | 4.293 (608) | 4.307 (610) | 1200 | 850 | N/D | 5.0 |
| 5.5 | N/D | 7.0 | 4.300 (609) | 4.307 (610) | 900 | 650 | N/D | 4.5 |
| 6.0 | 7.5 | 7.5 | 4.307 (610) | 4.307 (610) | 650 | 450 | 16.3 | 4.3 |

[1] The cation-containing brine had a Ba++ concentration of about 31.13 ppm.
[2] The anion-containing brine had a Ba++ concentration of about 0.0 ppm.
[3] "Eff" denotes effluent.
[4] "Lt" denotes left or remaining.
[5] "N/D" denotes not determined.

EXAMPLE 2

Control

Dynamic Test at Reservoir Temperature and Pressure 15 ppm Ba++ in Feed

The procedure of Example 1 was repeated with one major modification, namely, the stainless steel container was only filled with 20/40 U.S. Standard Sieve sand. The data obtained from this control experiment are listed in the following Table C and plotted in FIG. 1.

TABLE C

Core Devoid of Scale Nucleating Agent
15 ppm Ba++ In Feed

| Time, hrs | pH, Feed | pH, Eff[3] | Pressure, pascal (psig) Inlet | Pressure, pascal (psig) Outlet | Cation[1] Brine Lt[4], ml | Anion[2] Brine Lt, ml | Ba++, ppm Feed | Ba++, ppm Eff |
|---|---|---|---|---|---|---|---|---|
| 0.5 | N/D[5] | 7.5 | 4.376 (620) | 4.548 (645) | 3125 | 3125 | N/D | 15.5 |
| 1.0 | N/D | 7.5 | 4.376 (620) | 4.383 (621) | 2800 | 2800 | N/D | 16.0 |
| 1.5 | N/D | 7.5 | 4.376 (620) | 4.383 (621) | 2550 | 2550 | N/D | 16.0 |
| 2.0 | N/D | 7.5 | 4.376 (620) | 4.383 (621) | 2250 | 2250 | N/D | 16.0 |
| 2.5 | N/D | 7.5 | 4.376 (620) | 4.383 (621) | 2000 | 2000 | N/D | 16.5 |
| | | | 500 ml added to each brine | | | | | |
| 3.0 | N/D | 7.5 | 4.376 (620) | 4.383 (621) | 2300 | 2300 | N/D | 16.5 |
| 3.5 | N/D | 7.5 | 4.376 (620) | 4.383 (621) | 1900 | 1900 | N/D | 15.5 |
| 4.0 | N/D | 7.5 | 4.376 (620) | 4.383 (621) | 1600 | 1600 | N/D | 16.5 |
| 4.5 | N/D | 7.5 | 4.376 (620) | 4.383 (621) | 1350 | 1350 | N/D | 16.0 |
| 5.0 | N/D | 7.5 | 4.376 (620) | 4.411 (625) | 1100 | 1100 | N/D | 15.5 |
| 5.5 | N/D | 7.5 | 4.376 (620) | 4.411 (625) | 800 | 800 | N/D | 15.5 |
| 6.0 | 7.5 | 7.5 | 4.376 (620) | 4.411 (625) | 500 | 500 | 5.5 | 15.5 |

[1] The cation-containing brine had a Ba++ concentration of about 30.5 ppm.
[2] The anion-containing brine had a Ba++ concentration of about 0.0 ppm.
[3] "Eff" denotes effluent.
[4] "Lt" denotes left or remaining.
[5] "N/D" denotes not determined.

Figure 1:
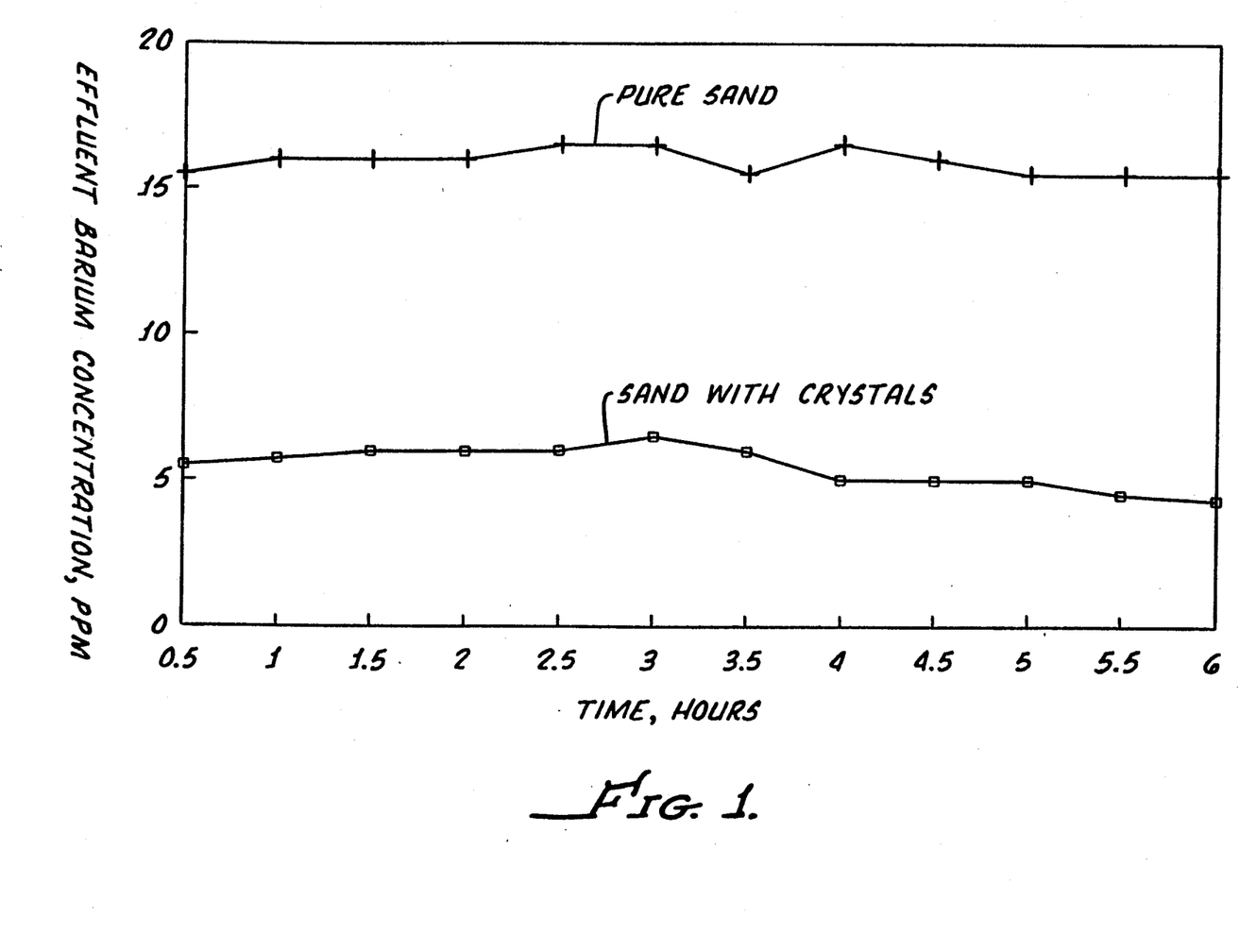
FIG. 1 is a graphical plot of data obtained from the comparative experiments of Examples 1-2, below, where, in Example 1, a brine containing about 15 ppm barium ions was passed through an experimental core containing a proppant and a scale nucleating agent, and, in Example 2, a similar brine was passed through a control core containing just the proppant and no scale nucleating agent.

The data set forth above in Tables B and C and plotted in FIG. 1 indicate that the mixture containing a proppant (namely, sand) and a scale nucleating agent (i.e., barium sulfate crystals) substantially reduced the concentration of a scale-forming constituent, namely, barium sulfate, in the scaling brine passed through the mixture. In contrast, the data also show that there was little, if any, reduction in the concentration of the scale-forming constituent when the scaling bring was passed through just the sand proppant.

EXAMPLE 3

Dynamic Test at Reservoir Temperature and Pressure 40 ppm Ba++ in Feed

The procedure of Example 1 was repeated with one major modification, namely, the concentration of the Ba++ in the feed water to the stainless steel container was increased to about 40 ppm. The data obtained from the experiment of this Example 3 are listed in the following Table D and plotted in FIG. 2.

TABLE D

Scale Nucleating Agent-Containing Core
40 ppm Ba++ In Feed

| Time, hrs | pH, Feed | pH, Eff[3] | Pressure, pascal (psig) Inlet | Pressure, pascal (psig) Outlet | Cation[1] Brine Lt[4], ml | Anion[2] Brine Lt, ml | Ba++, ppm Feed | Ba++, ppm Eff |
|---|---|---|---|---|---|---|---|---|
| 0.5 | N/D[5] | 7.5 | 4.238 (600) | 4.273 (605) | 3650 | 3500 | N/D | 6.5 |
| 1.0 | N/D | 7.5 | 4.293 (608) | 4.307 (610) | 3400 | 3250 | N/D | 6.5 |
| 1.5 | N/D | 7.5 | 4.300 (609) | 4.307 (610) | 3050 | 2900 | N/D | 6.5 |
| 2.0 | 7.5 | 7.5 | 4.300 (609) | 4.307 (610) | 2750 | 2600 | 38.5 | 5.0 |
| 2.5 | N/D | 7.0 | 4.293 (608) | 4.307 (610) | 2500 | 2300 | N/D | 4.5 |
| 3.0 | N/D | 7.5 | 4.300 (609) | 4.307 (610) | 2250 | 2100 | N/D | 6.0 |
| 3.5 | N/D | 7.5 | 4.300 (609) | 4.307 (610) | 2000 | 1850 | N/D | 6.5 |
| 4.0 | N/D | 7.5 | 4.300 (609) | 4.307 (610) | 1650 | 1500 | N/D | 9.0 |
| 4.5 | 7.5 | 7.5 | 4.300 (609) | 4.307 (610) | 1350 | 1250 | 38.0 | 5.0 |
| 5.0 | N/D | 7.5 | 4.300 | 4.307 | 1050 | 950 | N/D | 5.0 |

TABLE D-continued

| | | | Scale Nucleating Agent-Containing Core 40 ppm Ba++ In Feed | | | | | |
|---|---|---|---|---|---|---|---|---|
| | | | Pressure, pascal (psig) | | Cation[1] Brine | Anion[2] Brine | Ba++, ppm | |
| Time, hrs | pH, Feed | pH, Eff[3] | Inlet | Outlet | Lt[4], ml | Lt, ml | Feed | Eff |
| 5.5 | N/D | 7.5 | 4.300 (609) | 4.307 (610) | 825 | 650 | N/D | 6.0 |
| 6.0 | 7.5 | 7.5 | 4.300 (609) | 4.307 (610) | 490 | 350 | 38.5 | 5.0 |

[1]The cation-containing brine had a Ba++ concentration of about 80.0 ppm.
[2]The anion-containing brine had a Ba++ concentration of about 0.0 ppm.
[3]"Eff" denotes effluent.
[4]"Lt" denotes left or remaining.
[5]"N/D" denotes not determined.

EXAMPLE 4

Control

Dynamic Test at Reservoir Temperature and Pressure 40 ppm Ba++ in Feed

The procedure of Example 3 was repeated with one major modification, namely, the stainless steel container was only filled with 20/40 U.S. Standard Sieve sand. The data obtained from this control experiment are listed in the following Table E and plotted in FIG. 2.

TABLE E

| | | | Core Devoid Of Scale Nucleating Agent 40 ppm Ba++ In Feed | | | | | |
|---|---|---|---|---|---|---|---|---|
| | | | Pressure, pascal (psig) | | Cation[1] Brine | Anion[2] Brine | Ba++, ppm | |
| Time, hrs | pH, Feed | pH, Eff[3] | Inlet | Outlet | Lt[4], ml | Lt, ml | Feed | Eff |
| 0.5 | N/D[5] | 7.5 | 4.438 (629) | 4.445 (630) | N/D | N/D | N/D | 32.2 |
| 1.0 | N/D | 7.5 | 4.459 (632) | 4.507 (639) | 3400 | 3350 | N/D | 23.3 |
| 1.5 | N/D | 7.5 | 4.479 (635) | 4.514 (640) | 3100 | 3025 | N/D | 18.5 |
| 2.0 | 7.5 | 7.5 | 4.493 (637) | 4.514 (640) | 2750 | 2700 | 40.5 | 17.5 |
| 2.5 | N/D | 7.5 | 4.500 (638) | 4.514 (640) | 2500 | 2450 | N/D | 17.5 |
| 3.0 | N/D | 7.5 | 4.500 (638) | 4.514 (640) | 2250 | 2150 | N/D | 18.0 |
| 3.5 | N/D | 7.5 | 4.500 (638) | 4.514 (640) | 1850 | 1800 | N/D | 18.5 |
| 4.0 | 7.5 | 7.5 | 4.486 (636) | 4.507 (639) | 1650 | 1550 | 37.5 | 17.0 |
| 4.5 | N/D | 7.5 | 4.459 (632) | 4.500 (638) | 1300 | 1275 | N/D | 14.0 |
| 5.0 | N/D | 7.5 | 4.459 (632) | 4.500 (638) | 1025 | 1000 | N/D | 14.0 |
| 5.5 | N/D | 7.5 | 4.459 (632) | 4.507 (638) | 750 | 700 | N/D | 14.0 |
| 6.0 | 7.5 | 7.5 | 4.459 (632) | 4.507 (639) | 500 | 450 | 38.5 | 14.0 |

[1]The cation-containing brine had a Ba++ concentration of about 87.5 ppm.
[2]The anion-containing brine had a Ba++ concentration of about 0.0 ppm.
[3]"Eff" denotes effluent.
[4]"Lt" denotes left or remaining.
[5]"N/D" denotes not determined.

Figure 2:
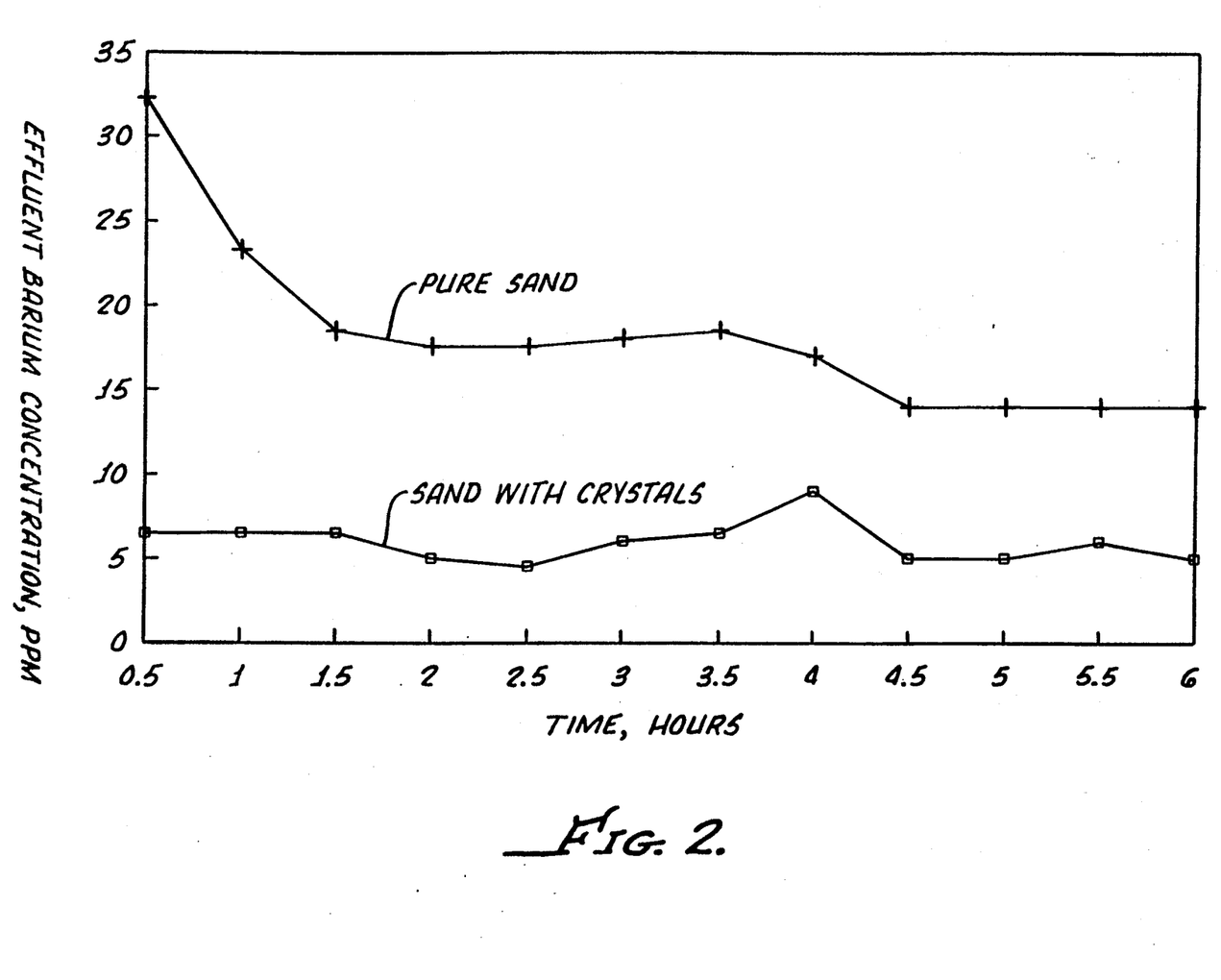
FIG. 2 is a graphical plot of data obtained from the comparative experiments of Examples 3-4, below, where, in Example 3, a brine containing about 40 ppm barium ions was passed through an experimental core containing a proppant and a scale nucleating agent, and, in Example 4, a similar brine was passed through a control core containing just the proppant and no scale nucleating agent.

The data set forth above in Tables D and E and plotted in FIG. 2 indicate that the mixture containing a proppant (namely, sand) and a scale nucleating agent (i.e., barium sulfate crystals) substantially reduced the concentration of a scale forming constituent, namely, barium sulfate, in the scaling brine passed through the mixture. The data also show that there is a smaller degree of reduction in the concentration of the scale forming constituent when the scaling brine passed through just the sand proppant. The latter reduction is believed to be due to the extremely high Ba++ concentration in the scaling brine, rendering the brine very unstable.

Although the present invention has been described in detail with reference to some preferred versions, other versions are possible. Therefore, the spirit and scope of the appended claims should not necessarily be limited to the description of the preferred versions contained herein.

What is claimed is:

1. A fracturing method comprising the step of injecting through a production well and into at least a portion of a subterranean formation under hydraulic fracturing conditions a fracturing fluid comprising a carrier fluid and a proppant, characterized in that the fracturing fluid further comprises a nucleating agent in a sufficient concentration to reduce the concentration of one or more ingredients selected from the group consisting of scale-forming ingredients, natural occurring radioactive materials (NORMs), and mixtures thereof present in an aqueous subterranean fluid produced from the production well.

2. The method of claim 1 wherein the fracturing fluid comprises about 0.01 to about 15 volume percent nucleating agent based on the volume of the proppant present in the fracturing fluid.

3. The method of claim 1 wherein the fracturing fluid comprises about 0.1 to about 10 volume percent nucleating agent based on the volume of the proppant present in the fracturing fluid.

4. The method of claim 1 wherein the fracturing fluid comprises about 1 to about 5 volume percent nucleating agent based on the volume of the proppant present in the fracturing fluid.

5. The method of claim 1 wherein the nucleating agent is selected from the group consisting of alkaline earth metal sulfates, alkaline earth metal carbonates, and mixtures thereof.

6. The method of claim 1 wherein the nucleating agent is selected from the group consisting of barium sulfate, barium carbonate, calcium sulfate, calcium carbonate, magnesium carbonate, magnesium sulfate, and mixtures thereof.

7. The method of claim 1 wherein the nucleating agent is selected from the group consisting of alkaline earth metal sulfates, alkaline earth metal carbonates, and mixtures thereof, and the alkaline earth metal is selected from the group consisting of magnesium, calcium, strontium, and barium.

8. The method of claim 1 wherein the nucleating agent is selected from the group consisting of alkaline earth metal sulfates, alkaline earth metal carbonates, and mixtures thereof, and the alkaline earth metal comprises barium.

9. The method of claim 1 wherein the nucleating agent is substantially uniformly distributed throughout the injected fracturing fluid.

10. The method of claim 1 wherein the nucleating agent is non-uniformly distributed in the injected fracturing fluid.

11. The method of claim 1 wherein the fracturing fluid further comprises at least one additional ingredient selected from the group consisting of friction-reducing additives, fluid-loss-control additives, gelling agents, bactericides, and scale stabilizers.

12. The method of claim 1 wherein the fracturing fluid comprises at least about 0.01 volume percent nucleating agent based on the volume of the proppant present in the fracturing fluid.

13. The method of claim 1 further comprising the step of reducing the concentration of one or more NORMs present in the aqueous subterranean fluid produced from the production well.

14. The method of claim 1 further comprising the step of reducing the concentration of one or more scale-forming ingredients present in the aqueous subterranean fluid produced from the production well.

15. The method of claim 1 further comprising the step of reducing the concentration of one or more scale-forming ingredients present and one or more NORMs present in the aqueous subterranean fluid produced from the production well.

16. A natural resource system comprising:
(a) a subterranean formation;
(b) a well penetrating at least a portion of the subterranean formation; and
(c) a fracture present in at least a portion of the subterranean formation, the fracture being formed by the method of claim 1.

17. A fracturing method comprising the step of injecting through a production well and into at least a portion of a subterranean formation under hydraulic fracturing conditions a fracturing fluid comprising a carrier fluid and a nucleating agent for reducing the concentration of one or more ingredients selected from the group consisting of scale-forming ingredients, natural occurring radioactive materials (NORMs), and mixtures thereof present in an aqueous subterranean fluid produced from the production well, wherein the nucleating agent is selected from the group consisting of alkaline earth metal sulfates, alkaline earth metal carbonates, and mixtures thereof and the fracturing fluid comprises at least about 0.01 volume percent nucleating agent based on the total volume of the fracturing fluid.

18. The method of claim 17 wherein the fracturing fluid further comprises at least one additional ingredient selected from the group consisting of proppants, friction-reducing additives, fluid-loss-control additives, gelling agents, bactericides, and scale stabilizers.

19. The method of claim 17 wherein the fracturing fluid comprises about 0.01 to about 20 volume percent nucleating agent based on the total volume of the fracturing fluid.

20. The method of claim 17 wherein the fracturing fluid comprises about 0.1 to about 10 volume percent nucleating agent based on the total volume of the fracturing fluid.

21. The method of claim 17 wherein the fracturing fluid comprises about 1 to about 5 volume percent nucleating agent based on the total volume of the fracturing fluid.

22. The method of claim 17 wherein the alkaline earth metal is selected from the group consisting of magnesium, calcium, strontium, and barium.

23. The method of claim 17 wherein the alkaline earth metal comprises barium.

24. The method of claim 17 wherein the nucleating agent is selected from the group consisting of barium sulfate, barium carbonate, calcium sulfate, calcium carbonate, magnesium carbonate, magnesium sulfate, and mixtures thereof.

25. A natural resource system comprising:
(a) a subterranean formation;
(b) a well penetrating at least a portion of the subterranean formation; and
(c) a fracture present in at least a portion of the subterranean formation, the fracture being formed by the method of claim 17.

26. A fracturing method comprising the step of injecting through a production well and into at least a portion of a subterranean formation under hydraulic fracturing conditions a fracturing fluid comprising a carrier fluid and a nucleating agent for reducing the concentration of one or more ingredients selected from the group consisting of scale-forming ingredients, natural occurring radioactive materials (NORMs), and mixtures thereof present in an aqueous subterranean fluid produced from the production well, wherein the fracturing fluid comprises at least about 0.01 volume percent nucleating agent based on the total volume of the fracturing fluid.

27. The method of claim 26 wherein the fracturing fluid further comprises at least one additional ingredient selected from the group consisting of proppants, friction-reducing additives, fluid-loss-control additives, gelling agents, bactericides, and scale stabilizers.

28. The method of claim 26 wherein the fracturing fluid comprises about 0.01 to about 20 volume percent nucleating agent based on the total volume of the fracturing fluid.

29. The method of claim 26 wherein the fracturing fluid comprises about 0.01 to about 10 volume percent nucleating agent based on the total volume of the fracturing fluid.

30. The method of claim 26 wherein the fracturing fluid comprises about 1 to about 5 volume percent nucleating agent based on the total volume of the fracturing fluid.

31. A natural resource system comprising:
(a) a subterranean formation;
(b) a well penetrating at least a portion of the subterranean formation; and
(c) a fracture present in at least a portion of the subterranean formation, the fracture being formed by the method of claim 26.

32. A fracturing method comprising the step of injecting through a production well and into at least a portion of a subterranean formation under hydraulic fracturing conditions a fracturing fluid comprising (a) a carrier fluid, (b) a proppant, and (c) a nucleating agent for reducing the concentration of one or more ingredients selected from the group consisting of scale-forming ingredients, natural occurring radioactive materials (NORMs), and mixtures thereof present in an aqueous subterranean fluid produced from the production well, wherein the fracturing fluid comprises at least about 0.01 volume percent nucleating agent based on the volume of the proppant in the fracturing fluid.

33. The method of claim 32 wherein the fracturing fluid comprises about 0.01 to about 15 volume percent nucleating agent based on the volume of the proppant present in the fracturing fluid.

34. The method of claim 32 wherein the fracturing fluid comprises about 0.1 to about 10 volume percent nucleating agent based on the volume of the proppant present in the fracturing fluid.

35. The method of claim 32 wherein the fracturing fluid comprises about 1 to about 5 volume percent nucleating agent based on the volume of the proppant present in the fracturing fluid.

36. The method of claim 32 wherein the nucleating agent is selected from the group consisting of alkaline earth metal sulfates, alkaline earth metal carbonates, and mixtures thereof.

37. The method of claim 32 wherein the nucleating agent is selected from the group consisting of barium sulfate, barium carbonate, calcium sulfate, calcium carbonate, magnesium carbonate, magnesium sulfate, and mixtures thereof.

38. The method of claim 32 further comprising the step of reducing the concentration of one or more NORMs present in the aqueous subterranean fluid produced from the production well.

39. The method of claim 32 further comprising the step of reducing the concentration of one or more scale-forming ingredients present in the aqueous subterranean fluid produced from the production well.

40. The method of claim 32 further comprising the step of reducing the concentration of one or more scale-forming ingredients present and one or more NORMs present in the aqueous subterranean fluid produced from the production well.

41. The method of claim 32 wherein the nucleating agent is selected from the group consisting of alkaline earth metal sulfates, alkaline earth metal carbonates, and mixtures thereof, and the alkaline earth metal is selected from the group consisting of magnesium, calcium, strontium, and barium.

42. The method of claim 32 wherein the nucleating agent is selected from the group consisting of alkaline earth metal sulfates, alkaline earth metal carbonates, and mixtures thereof, and the alkaline earth metal comprises barium.

43. The method of claim 32 wherein the fracturing fluid further comprises at least one additional ingredient selected from the group consisting of friction-reducing additives, fluid-loss-control additives, gelling agents, bactericides, and scale stabilizers.

44. A natural resource system comprising:
(a) a subterranean formation;
(b) a well penetrating at least a portion of the subterranean formation; and
(c) a fracture present in at least a portion of the subterranean formation, the fraction being formed by the method of claim 32.

* * * * *

UNITED STATES PATENT AND TRADEMARK OFFICE
CERTIFICATE OF CORRECTION

PATENT NO. : 5,322,121

DATED : June 21, 1994

INVENTOR(S) : Marty J. Hrachovy

It is certified that error appears in the above-identified patent and that said Letters Patent is hereby corrected as shown below:

Claim 29, column 12, line 68, replace "0.01" with -- 0.1 --.

Signed and Sealed this

Twentieth Day of September, 1994

Attest:

BRUCE LEHMAN

*Attesting Officer*        *Commissioner of Patents and Trademarks*